Oct. 26, 1926.
J. B. FLICK
1,604,816
COMBINED GUIDE AND PROTECTOR FOR USE IN UNIVERSAL JOINTS
Filed Nov. 16, 1925
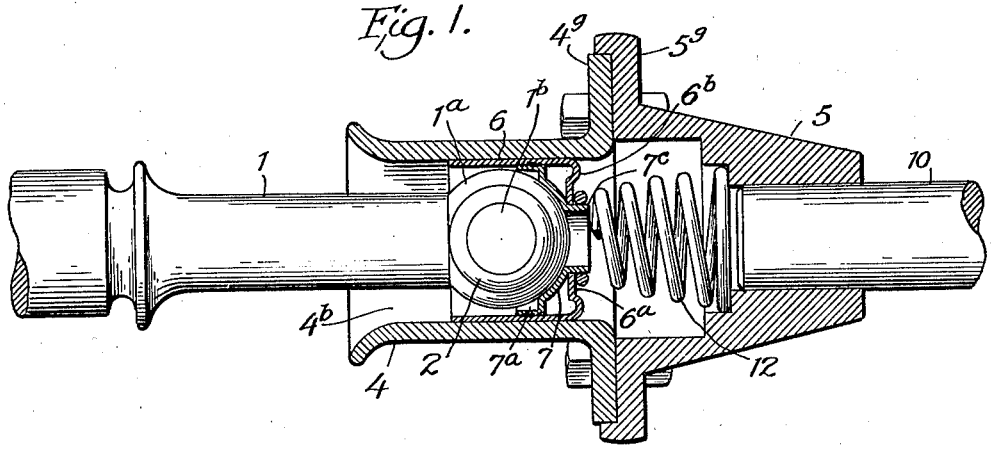
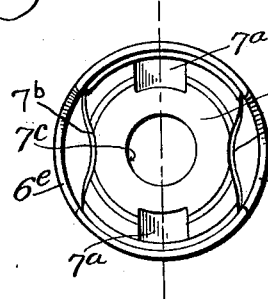
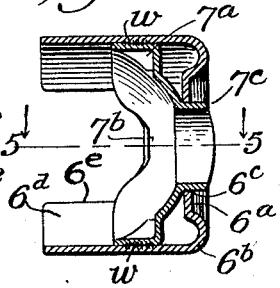
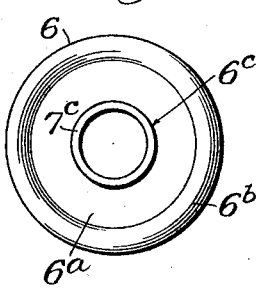
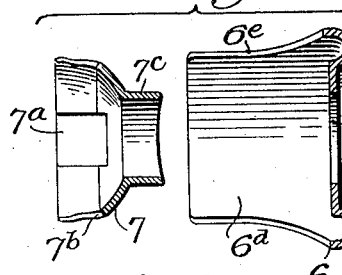
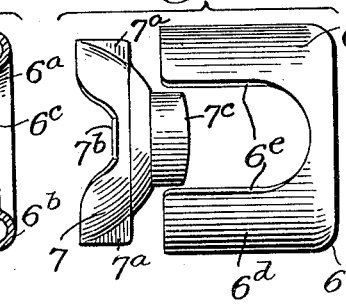
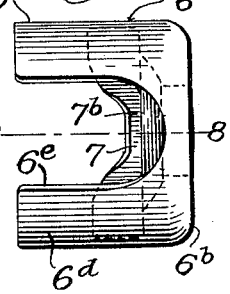
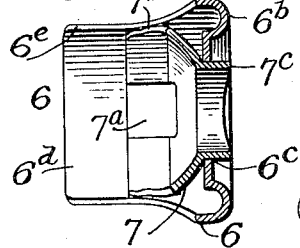
Inventor
John B. Flick
By Alexander D. Powell
Attorney Patented Oct. 26, 1926.

1,604,816

UNITED STATES PATENT OFFICE.

JOHN B. FLICK, OF DETROIT, MICHIGAN.

COMBINED GUIDE AND PROTECTOR FOR USE IN UNIVERSAL JOINTS.

Application filed November 16, 1925. Serial No. 69,286.

This invention relates to universal joint couplings for use in transmitting power from a driving to a driven shaft, and has particular reference to that type of universal joint wherein the driven shaft is provided on its end with a globular head and a transverse pin carrying rollers or balls which engage diametrically opposite slots in a member fixedly attached to the adjacent end of the driving shaft, thus insuring simultaneous rotatorial movement of the shafts while permitting angular displacement of one shaft relative to the other, and permitting slight endwise longitudinal play of one shaft relative to the other; such joints being particularly adapted for use in the transmission gear of automobiles.

In this type of joint an expansion spring is ordinarily used to prevent rattling due to relative endwise movements of the shafts, when used in the transmission gear of an automobile; and the relative angular movements of the shafts tend to displace the spring and cause it to operate inefficiently and to cut into the end of the shaft with which it engages.

In my Patent No. 1,512,840 I have shown a novel guide and protector adapted to prevent the spring wearing the end of the shaft, to keep the spring always in correct operative position, and to guide the ball head of the shaft in its longitudinal movements, thereby enabling a heavier spring to be used, lessening the wear on the parts, and enhancing the durability of the spring.

The present invention is an improvement upon my aforesaid patented guide and protector, and its object is to provide an improved guide and protector having greater wearing and bearing surfaces and less liable to be displaced in the housing of such universal joint.

I will describe the invention with reference to the accompanying drawings, and summarize in the claims the novel features of construction and novel combinations of parts for which protection is desired.

In said drawings:

Figure 1 is a longitudinal sectional view of a universal joint equipped with my novel guide and protector.

Figure 2 is a front end view of the guide and protector detached.

Figure 3 is a vertical section on the line 3—3 Figure 2.

Figure 4 is a rear end view of the guide and protector.

Figure 5 is a longitudinal sectional view on the line 5—5, Figure 3, showing the parts of the guide and protector disassociated.

Figure 6 is a side view of the said parts disassociated.

Figure 7 is a side view of the complete guide and protector.

Figure 8 is a vertical section of the complete guide associated on the line 8—8, Figure 7.

The type of joint illustrated in Figures 1 and 2 comprises a shaft member 1 having a ball-head $1^a$ transfixed by a pin $1^b$ on whose ends are mounted rollers or balls 2 at opposite sides of the ball-head $1^a$. The head $1^a$ and balls 2 are entered into one member 4 of a casing, preferably composed of two separable members 4 and 5, as shown in the drawings. As shown in my said patent part 4 of the casing is provided with an axial bore, slightly larger in diameter than the ball-head $1^a$, and at diametrically opposite sides of the bore with slots in which the rollers 2 enter. The part 4 is open at its outer end, through which the shaft 1 enters, and its inner end is provided with a flange $4^g$ bolted to a flange $5^g$ on the end of the complemental casing member 5 formed on or keyed to a shaft 10.

An expansion spring 12 is placed in the casing between the inner end of the shaft 10 and the ball-head $1^a$ of the shaft 1. To prevent the spring cutting the ball head $1^a$, and to guide the ball head, protect the ball head and spring from wear, and to enable a lighter spring to be employed, the present invention provides an improved ball-head protector and guide and spring centering device which comprises a cup-shaped member 6 and an inner cup-shaped member 7.

Each of the members 6 and 7 of the guide and protector is preferably formed of pressed or drawn sheet steel or other suitable material. As shown the outer member or shell 6 is approximately cup-shaped and is open at one end and its other end is substantially closed by a head $6^a$ which is provided with a central aperture $6^c$; and the head is preferably connected with the side portion of the shell by a bead $6^b$. The outer shell 6 has slots $6^e$ in its sides; and the side portions of the shell between these slots form parallel diametrically opposite leg portions 6ᵈ which are parti-cylindric in cross section and preferably are long enough to extend on opposite sides of the ball head 1ᵃ and between said ball head and the walls of the axial bore 4ᵇ in casing member 4 as shown in Figure 1. The leg portions 6ᵈ of the shell 6 lie at opposite sides of the ball-head 1ᵃ and will prevent the guide and protector rocking in the bore 4ᵇ while permitting it to freely slide therein.

The inner member 7 has a parti-spherical end portion adapted to neatly fit against the inner end of the ball-head 1ᵃ as in Figure 1, and is of a major diameter to fit closely within the shell 6, as shown in Figures 1, 2 and 3, and said member 7 is provided with a central aperture surrounded by a flange 7ᶜ which is adapted to project through the aperture 6ᵉ in the shell 6 and form a close joint therewith, as in Figures 3 and 8. The member 7 is also provided with opposite slots or notches 7ᵇ which practically register with the slots 6ᵉ in the shell 6, as indicated in Figures 3 and 7. Member 7 is also provided with preferably diametrically disposed peripheral projections 7ᵃ, the outer surfaces of which are cylindric, as indicated in Figure 2, and contact on their exterior surfaces with the interior surfaces of the shell 6. These projections 7ᵃ are preferably welded to the leg portions 6ᵈ of the shell 6, as indicated at w in Figure 3, so as to unite the parts. Obviously the parts 6 and 7 might be securely fastened together in any suitable manner.

It will be seen that the combined guide and protector is free to move longitudinally in the casing with the ball head, but will not oscillate or turn with the ball head relative to the axis of pin 1ᵇ, or to the axis of bore 4ᵇ. The ball-head 1ᵃ can move freely in all directions within the guide and protector, and the latter is capable of longitudinal sliding movements in the bore 4ᵇ, and will under the action of spring 12 follow up the ball-head in any longitudinal movement thereof in the casing.

As compared with the protector shown in my aforesaid patent, the improved guide and protector has an extended bearing at each side of the ball 1, and this obviates any tendency or possibility of the guide and protector turning or tending to turn around on the ball as it moves therewith in the casing. Further the improved guide and protector is stronger than that shown in my aforesaid patent, and it is easier to separably draw the member 6 and 7 than the one-piece guide and protector shown in the patent, and the short member 7 is reinforced by the exterior shell and the latter in turn is reinforced by the inner member.

The shell 6 is preferably provided with an opening in its end 6ᵃ next to shaft 10, and the member 7 is preferably provided with a flange 7ᶜ which projects through this opening, and with such flange the inner end of spring 7 is engaged, as in Figure 1, but I do not consider the invention restricted to such opening and flange. The pressure of the spring 12 is transmitted through the guide and protector to the ball-head 1ᵃ; and while the ball head can rock within the guide and protector its rocking motions will not be transmitted to the spring 12 nor can the spring chafe or bind on the head. The guide and protector thus protects the ball-head from wear by contact with the spring, and keeps the spring 12 in alignment with the axis of bore 4ᵇ and prevents chattering of the spring, and enhances the durability, efficiency and wearing qualities of the joint.

When the parts are assembled the space between the ball head 1ᵃ and the shaft 10 should be packed with grease, so all the parts will be properly lubricated during the operation thereof.

The operation of the parts will be obvious from the drawings and from the foregoing description, and the adaptability of the guide and protector to various forms of ball heads will be obvious.

I claim:

1. For a universal joint of the character specified, a combined guide and protector comprising an inner member adapted to engage the ball head of the shaft member of the joint, and an outer member surrounding the inner member and engaging the bore of the casing member of the joint.

2. In a combined guide and protector as set forth in claim 1, said inner member having peripheral projections whereby it may be secured in the outer member.

3. A combined guide and protector for the purpose specified comprising a shell member having portions engaging the bore of the casing member of the joint and an end portion adapted to be engaged by the spring in the joint, and an inner member fitted within said shell and adapted to engage the ball-head of the shaft member of the joint.

4. In a combined guide and protector as set forth in claim 3, said inner member having peripheral projections whereby it may be secured in the shell.

5. For a universal joint for the purpose specified, a combined guide and protector comprising an inner cup-like member adapted to directly engage the ball-head of the shaft member of the coupling, and a central opening surrounded by a flange; with an outer member enclosing said inner member and open at one end and having a head on its other end provided with a central opening for the passage of the flange of the inner member.

6. In a combined guide and protector as set forth in claim 5, said inner member having peripheral projections whereby it may be secured in the outer member.

7. For a universal joint for the purpose specified, a combined guide and protector comprising an inner cup-like member formed of drawn metal and having a portion shaped to directly engage the ball-head of the shaft member of the coupling, and a central opening surrounded by a flange and diametrically opposite notches, with an outer shell surrounding said inner member and open at one end and having a head on its other end with a central opening to accommodate the flange of the inner member, said shell having slots in its sides registering with the notches of the inner member and parallel leg portions extending at opposite sides of the head and beyond the inner member adapted to engage the walls of the bore of the casing at opposite sides of the ball head.

8. In a combined guide and protector as set forth in claim 7, said inner member having peripheral projections whereby it may be secured in the shell.

In testimony that I claim the foregoing as my own, I affix my signature.

JOHN B. FLICK.